United States Patent
Gharapetian et al.

(10) Patent No.: US 9,505,922 B2
(45) Date of Patent: Nov. 29, 2016

(54) SELF-COALESCING LATEX

(75) Inventors: Hrire Gharapetian, Ridgewood, NJ (US); Navin Tilara, Roseland, NJ (US); Robert Sheerin, North Caldwell, NJ (US)

(73) Assignee: Columbia Insurance Company, Omaha, NE (US)

( * ) Notice: Subject to any disclaimer, the term of this patent is extended or adjusted under 35 U.S.C. 154(b) by 449 days.

(21) Appl. No.: 14/009,295

(22) PCT Filed: May 15, 2012

(86) PCT No.: PCT/US2012/037963
§ 371 (c)(1),
(2), (4) Date: May 6, 2014

(87) PCT Pub. No.: WO2012/158703
PCT Pub. Date: Nov. 22, 2012

(65) Prior Publication Data
US 2014/0235752 A1    Aug. 21, 2014

Related U.S. Application Data

(60) Provisional application No. 61/487,093, filed on May 17, 2011.

(51) Int. Cl.
C08L 33/12 (2006.01)
C09D 133/00 (2006.01)
C09D 133/12 (2006.01)

(52) U.S. Cl.
CPC ............. C08L 33/12 (2013.01); C09D 133/00 (2013.01); C09D 133/12 (2013.01)

(58) Field of Classification Search
CPC ........ C08L 33/12; C08D 33/00; C08D 33/12
See application file for complete search history.

(56) References Cited

U.S. PATENT DOCUMENTS

| | | | | |
|---|---|---|---|---|
| 3,700,437 A | * | 10/1972 | Eastler, Jr. | ............. G03C 1/705 430/66 |
| 4,916,171 A | * | 4/1990 | Brown | ................ C04B 20/1033 523/161 |
| 2004/0010071 A1 | | 1/2004 | Gebhart et al. | |
| 2005/0004272 A1 | | 1/2005 | Kuo et al. | |
| 2005/0191445 A1 | | 9/2005 | Sen et al. | |
| 2007/0148357 A1 | * | 6/2007 | Joecken | ................... C09D 5/02 427/407.1 |
| 2007/0167545 A1 | | 7/2007 | Sugerman et al. | |
| 2008/0058473 A1 | | 3/2008 | Freidzon et al. | |
| 2008/0260014 A1 | | 10/2008 | Yang et al. | |

OTHER PUBLICATIONS

Tamol 963 MSDS (2015).*
International Search Report issued in connection with the corresponding International Application Application No. PCT/US2012/037963 on Aug. 17, 2012.

* cited by examiner

Primary Examiner — Mark Kaucher
(74) Attorney, Agent, or Firm — The H.T. Than Law Group

(57) ABSTRACT

The present invention relates to self-coalescing latexes that incorporate film fat ing polymers that are low molecular weight polymers that are compatible with the latex and act as thin plasticizers penetrating through the remainder of the latex particle and aiding in the coalescence of the remaining polymers. In a preferred embodiment, the self-coalescing latex is a sequentially polymerized polymer having at least a core, a shell and a skin. The film forming polymers are formed of monomers substantially the same as the monomers of the shell but having average weighted molecular weights substantially less than the polymers of the shell. The present invention also relates to the method of polymerizing the self-coalescing latex of the current invention, which largely results from the addition of a substantial amount of chain transfer agent to a remaining portion, about 15% or less, of the monomer pre-emulsion prior to polymerization. Lastly, the invention relates to paint compositions incorporating the self-coalescing latexes that are substantially free of coalescing agents or aids.

30 Claims, No Drawings

SELF-COALESCING LATEX

FIELD OF THE INVENTION

The present invention relates to self-coalescing latex and the method by which the self-coalescent latex is polymerized. The self-coalescing latex is formed in situ by introducing a substantial amount of chain transfer agent in the final moments of polymerization. This generates a low molecular weight soft polymer portion of the self-coalescing latex that acts as a thin plasticizer. The self-coalescing latex of the current invention eliminates the need for a separate coalescing agent, and thereby avoids issues surrounding compatibility with and adverse impacts of coalescing agents, specifically low- and no-VOC coalescents.

BACKGROUND OF THE INVENTION

An important factor for any latex paint for household use is its ability to form a continuous and consistent film at ambient temperatures, the temperature at which the paint is applied. The film formation process for latex paints involves a three step process: (1) evaporation of bulk water and latex particle packing; (2) particle deformation with collapse of the interstitial voids between latex particles; and (3) the coalescence of polymer chains between the residual particles leading to a fully developed coating/film. The minimum film-forming temperature ("MFFT") of latex is the lowest temperature at which these processes will successfully occur, i.e. result in a uniformly coalesced film. Various properties of the constituent polymers of the latex such as their glass transition temperature ($T_g$), particle size and particle distribution, molecular weight, and particle morphology may have a direct effect on the minimum film-formation temperature and/or film formation process of the latex. For example, soft polymers, polymers with low $T_g$ easily deform and yield excellent film formation properties, but the resulting film is often tacky and has poor mechanical properties. Alternatively, hard polymers, polymers with high $T_g$ or semi-crystalline structure, maintain the physical properties of a film but do not form suitable films on their own since the hard polymers do not deform easily.

Coalescing agents, also known merely as coalescent or alternatively as film-forming agent or aid, may be added to conventional water-based latex paints to reduce the paints MFFT and thereby improve the paint's film forming properties. Typical coalescents are solvents such as Texanol™ and plasticizers such as Optifilm Enhancer 400™. These agents act during the drying process to allow the latex binder particles to coalesce, join physically, and form a continuous film at desired application temperatures. The coalescents eventually either evaporate from the resin film, in the case of solvents, or incorporate into the resulting dried latex paint film, in the case of plasticizers. The concentrations of coalescents within latex paints may vary from about 0% to about 30% by weight based on the weight of the polymeric binder solids.

Unfortunately, compatibility issues may arise between the coalescent agent and the latex binders and or additives to the paint composition. These compatibility issues may impair the physical properties of the resulting film such as block, mar, water, and/or stain resistance. The coalescents may also be flammable, introducing a fire hazard to the paint system. Additionally, the evaporation of the coalescents, especially solvents, leads to unpleasant odors and growing concerns about the environmental and health hazards posed by volatile organic evaporates. Numerous environmental regulations have limited the amount of volatile organic compound (VOC) allowable in coatings. In the past few years, coating manufacturers attempting to comply with the regulations have sought to substitute low- and no-VOC coalescents in latex paint formulations without compromising physical properties and smooth film formation of the resulting paints.

Less volatile or nonvolatile coalescents are disclosed in US 2007/0167545 to Sugerman et al., which employs nonvolatile, unsaturated ethers and/or esters in combination with small proportions of low glass transition temperature ($T_g$) latex resins and optionally reactive amines as coalescents. US 2010/0130645 to Lynch et al., US 2009/0198002 to Zhou et al., US 2009/0151601 to Mangnus et al., US 2008/0103237 to Strepka et al., US 2005/0032954 to Brandenburger et al., and U.S. Pat. No. 4,894,406 to Smith et al. also disclose organic coalescents and coating compositions incorporating these organic coalescents that have low odor, such as fatty acid esters of ethylene glycol and/or propylene glycol, esters of adipic, glutaric, and/or succinic diacids, and a mixture of benzoates, diesters of glycols, and corresponding monesters.

Alternatively, other attempts to eliminate VOCs involve reducing or eliminating the need for coalescents altogether. Manufacturers have attempted to achieve this by incorporating more soft monomers or a blend of soft polymer (low $T_g$) and hard polymer (high $T_g$) to lower $T_g$ and MFFT of the latex, thereby reducing the amount of coalescents needed for smooth film formation. For example, U.S. Pat. No. 5,021,469 to Langerbeins et al., U.S. Pat. No. 6,140,408 to McCarthy et al., and co-pending US 2008/0058473 to Freidzon et al. disclose multistage latex polymers with low temperature coalescence comprising a hard center and a soft outer shell.

US 2002/0132055 to Drujon et al. discloses a low temperature film-forming latex based on hydrophobic polymers having 70-90% by weight of a soft core and 10-30% by weight of a hard shell.

U.S. Pat. No. 5,344,675 to Snyder discloses a blend of at least two emulsion polymers. The first latex comprises 50-95% by weight of a soft polymer and 5-50% by weight of a hard polymer, while the second latex is not an ambient temperature film-forming polymer. U.S. Pat. No. 5,731,377 to Friel discloses a polymer blend comprising 40-80% by weight of a soft emulsion polymer and 20-60% by weight of a hard emulsion polymer.

U.S. Pat. No. 6,646,085 to Craun et al., U.S. Pat. No. 6,303,188 to Bors et al., U.S. Pat. No. 5,610,225 to Farwaha et al., and U.S. Pat. No. 6,087,437 to Farwaha et al. disclose copolymers containing soft flexible polymer units useful in paint compositions free of volatile organic coalescents.

The problem with these approaches is that latex binders with relatively large portions of soft monomers lead to poor paint properties compromising film hardness, block resistance, print resistance, dirt pick-up resistance, and/or mar resistance. Thus, there still remains a need for a latex paint composition eliminating external coalescents for adequate film formation, while maintaining desirable paint properties.

SUMMARY OF THE INVENTION

A first embodiment of the invention relates to a self-coalescing latex polymer. The polymer is comprised of at least 10-50% of hard monomers, 10-60% of soft monomers, and 0-10% of hydrophilic, hydrophobic or functional monomers. The polymer further comprises a film forming polymer having a weighted average molecular weight of less than about 40,000 Daltons which is present in about 0.5% by weight to less than 10% by weight of the polymer.

A variation of the embodiment is related to a self-coalescing latex wherein the self-coalescing latex polymer is a sequentially designed polymer having at least a first stage, a second stage, and a third stage. The monomers for the first stage comprise hard monomers; the monomers for the second stage comprise soft monomers; and the third stage is comprised of the film forming polymer. In a further embodiment, the first stage comprises a core of the sequentially designed polymer, the second stage comprises a shell of the sequentially designed polymer, and the third stage comprises a skin of the sequentially designed polymer.

In another embodiment of the invention, the core of the self-coalescing latex is comprised of hard monomers selected from methacrylic monomers, acrylonitrile monomers, styrene monomers, vinyl halide monomers, and vinyl acetate monomers. Preferably the hard monomer is comprises methyl methacrylate. In another embodiment, the core is further comprised of hydrophobic monomers. The core in another embodiment may have a weighted average molecular weight between about 175,000 to about 250,000 Daltons. Preferably, the core has a weighted average molecular weight of between about 190,000 to 240,000 Daltons. In additional embodiments, the core has a glass transition temperature of about 50 to 130° C., preferably about 70 to 110° C. In a further embodiment, the core comprises about 10 to 50% of the latex.

In other embodiments, the soft monomers forming the shell are selected from acrylic monomers, vinyldiene halide monomers, alkylene monomers, and glycidyl acrylate monomers. Preferably the soft monomers are selected from ethyl acrylate, butyl acrylate, butyl methacrylate, and 2-ethylhexy acrylate. In a further embodiment, the shell further comprises hydrophilic monomers and functional monomers, such as crosslinking or wet adhesion monomers. In a further embodiment, the shell has a weighted average molecular weight between 75,000 to 175,000 Daltons, preferably about 90,000 to 150,000 Daltons. Further, shell polymer has a glass transition temperature in the range of −10 to 50° C., preferably about 10 to 40° C., in further embodiments.

In a further embodiment, the skin of the self-coalescing latex has a monomer composition that is substantially similar to that of the shell. Further, the skin polymer has a weighted average molecular weight that is less than about 25% of the weighted average molecular weight of the shell polymer. In other embodiments the weighted average molecular weight of the skin is about 10,000 to 40,000 Daltons, preferably about 15,000 to 35,000 Daltons.

The self-coalescing latex has a minimum film forming temperature between about −5° C. to 5° C. in a further embodiment.

A second embodiment of the invention is the sequential emulsion polymerization method for producing the self-coalescing latex. It comprises the steps of: preparing a monomer pre-emulsion mixture for core, preparing a monomer pre-emulsion mixture for shell, initiating polymerization of the monomer pre-emulsion mixture for core to form the core, treating the core with a substantial portion of the monomer pre-emulsion for shell to form a shell, charging a remaining portion of the monomer pre-emulsion for shell with a chain transfer agent, and treating the shell with the remaining portion of the monomer pre-emulsion to form a skin. The process results in a polymer wherein the average molecular weight of a polymer of the skin is substantially less than the weighted average molecular weight of a polymer of the shell.

In a further embodiment of the polymerization method, the remaining portion of the shell monomer pre-emulsion for the skin is about 10% of the monomer pre-emulsion for shell.

The sequential emulsion polymerization method utilizes a chain transfer agent selected from halomethanes, chloroform, carbon tetrachloride, carbon tetrabromide, bromotrichloromethane, mercapatol, methylthioglycol, isooctyl 2-mercaptopropionate, isooctylmercaptopropionate, aromatic mercaptans, long chain alkylmercaptans, or disulfides in a further embodiment. Preferably, the chain transfer agent is isooctylmercaptopropionate. In a further embodiment 2-3% by weight of the chain transfer agent is added to the monomer pre-emulsion for shell.

A third embodiment of the current invention relates to paint composition incorporating the self-coalescing latex of the first embodiment and the polymer resulting from the polymerization method of the second embodiment that is free of additional coalescing agents. In a further embodiment, the paint compositions have a volatile organic compound content of less than 50 g/L.

DETAILED DESCRIPTION OF THE INVENTION

The present invention relates to a self-coalescing latex, a latex having a MFFT of less than or equal to the ambient conditions at which the latex is applied and dried the method of its polymerization, and paint compositions incorporating the inventive self-coalescing latex. The self-coalescing latex of the current invention provides several advances over the existing art. Primarily, the self-coalescing latex reduces the need to add a separate coalescing agent to a paint composition incorporating the inventive latex of this application. This avoids compatibility issues between a coalescing agent and various other components of the paint composition, and reduces a potential source of volatile organic compounds in the paint composition. Additionally, the self-coalescing latex of the current invention minimizes, and preferably, eliminates costs associated with the separate manufacture, storage, and incorporation of a coalescing agent. Specifically, the inventive self-coalescing latex is generated by a modification in situ to the polymerization of the latex, i.e. the addition of a substantial amount of chain transfer agent(s) to the last portion of the pre-emulsion (last 10% or less) before polymerization ends. Thus, the modification to the latex occurs without the costly addition of a discreet manufacturing step to the process. Moreover, the self-coalescing latex of the current invention achieves this improvement without sacrificing the toughness of the physical film formed and provides a synergistic enhancement to the physical characteristics of the resulting film. Namely, coatings produced by paint incorporating the self-coalescing latex of the current invention exhibit enhanced block, stain and scrub resistance.

The first embodiment of the invention is directed to sequentially designed self-coalescing latex. The latex comprises at least a core (first layer), a shell (second layer), and a skin or coating (a third layer). As noted above, the molecular weights of the constituent polymers may affect the MFFT, as measured by ASTM-D2354, of the latex, and thus the skin of the self-coalescing latex is comprised of a soft polymer having a substantially lower molecular weight than either the core or shell of the latex. This results in latex having a MFFT equal to or greater than about −5° C., and preferably having a MFFT between −5° C. and 5° C. As noted below, this results from the addition of a chain transfer agent to the sequential polymerization of the inventive self-coalescing latex before the last portion of the monomer pre-emulsion for the shell is polymerized. Without wishing to be bound to a particular theory, the inventors believe that the softer low molecular weight polymers of the skin diffuse through the remainder of the particle and thereby plasticize the polymers of the core and shell eliminating the need for a separate coalescing agent.

The core of the self-coalescing latex of the current invention is comprised of a hard polymer resulting from the use of substantially "hard" monomers. These monomers include, but are not limited to, methacrylic monomers including but not limited to methyl(meth)acrylate, ethyl (meth)acrylate, n-propyl(meth)acrylate, isopropyl(meth) acrylate, n-butyl(meth)acrylate, isobutyl(meth)acrylate, pentyl(meth)acrylate, 2-ethylhexyl(meth)acrylate, decyl (meth)acrylate, dodecyl(meth)acrylate, stearyl(meth)acrylate, α-chloroethyl(meth)acrylate, cyclohexyl(meth)acrylate, phenyl(meth)acrylate, methoxyethyl(meth)acrylate, ethoxyethyl (meth)acrylate, methoxypropyl(meth)acrylate, ethoxypropyl(meth)acrylate and the like; acrylonitrile monomers such as (meth)acrylbnitrile monomers and the like; styrene monomers including but not limited to styrene, methylstyrene, chlorostyrene, methoxystyrene and the like; vinyl halide monomers including, but not limited to, vinyl chloride, vinyl bromide, vinyl fluoride, chlorotrifluoroethylene, tetrafluoroethylene, and the like; and vinyl acetate monomers. Preferably, the hard monomer includes, but is not limited to, methyl methacrylate (MMA). MMA is a slightly hydrophobic monomer that aids in the compatibility and processing of the various monomers of the current self-coalescing latex. It is preferred that the polymers of the core be substantially comprised of the above noted "hard" monomers, and it is particularly preferred that the polymers of the core be solely comprised of "hard" monomers, however the core polymers may incorporate nominal (<5% by weight) of "soft," hydrophobic, hydrophilic, and/or functional monomers disclosed below.

The average molecular weight of the polymers of the core is: number average molecular weight ($M_n$) of about 30,000 to about 60,000 Daltons, preferably about 35,000 to about 55,000 Daltons, and more preferably about 40,000 to about 50,000 Daltons; and weighted average molecular weight ($M_w$) of about 175,000 to 275,000 Daltons, preferably about 190,000 to 250,000 Daltons, and most preferably about 200,000 to 230,000 Daltons. The polydispersity index (PDI) for the polymers of the core is about 3 to 9, preferably about 4 to 7, and most preferably about 5 to 6.

The shell of the self-coalescing latex of the current invention is comprised of a soft polymer resulting from the use of substantially "soft" monomers. These monomers include acrylic monomers including, but not limited to, butyl acrylate (BA), isobutyl acrylate, 2-ethylhexyl acrylate (EHA), isodecyl methacrylate, lauryl methacrylate, tridecylmethacrylate, and the like; vinyldiene halide monomers including but not limited to vinylidene chloride, vinylidene fluoride, and the like; alkylene monomers including, but not limited to, ethylene, propylene, butadiene, butylenes, isobutylene, isoprene, and the like; and glycidyl acrylate monomers. Specifically, the monomers may include, but are not limited to, ethyl acrylate, butyl acrylate (BA), butyl methacrylate (BMA), and 2-ethylhexyl acrylate (EHA). The polymers of the shell preferably are substantially comprised of "soft" monomers, and most preferably solely comprised of "soft" monomers, however the shell polymers may incorporate nominal (<5% by weight) of "hard" monomers disclosed above or the additional monomers such as the hydrophobic, hydrophilic, and/or functional monomers disclosed below.

The average molecular weight of the polymers of the shell is similar to that of the polymers of the core. In particular, the average molecular weight of the polymers of the shell are: number average molecular weight ($M_n$) of about 20,000 to about 50,000 Daltons, preferably about 25,000 to about 45,000 Daltons, and more preferably about 30,000 to about 40,000 Daltons; and weighted average molecular weight ($M_w$) of about 75,000 to 175,000 Daltons, preferably about 90,000 to 150,000 Daltons, and most preferably about 100,000 to 140,000 Daltons. The polydispersity index (PDI) for the polymers of the shell is about 2 to 8, preferably about 2.5 to 6, and most preferably about 3 to 4.

In addition to the "hard" and "soft" monomers disclosed above, the polymers of the core and shell may incorporate other monomers including, but not limited to, hydrophobic, hydrophilic, and functional monomers (including, but not limited to, wet adhesion and crosslinking monomers). Hydrophobic monomers, which improve the physical characteristics of the latex (i.e. improved block and water resistance), may include vinyl 2-ethylhexanoate, vinyl laurate, vinyl stearate, vinyl alkyl or aryl ethers with ($C_9$-$C_{30}$) alkyl groups such as stearyl vinyl ether; ($C_4$-$C_{30}$) alkyl esters of (meth-)acrylic acid, such as butyl (meth)acrylate, hexyl (meth)acrylate, heptyl (meth)acrylate, octyl (meth)acrylate, isooctyl acrylate, isononyl acrylate, decyl (meth)acrylate, isodecyl (meth)acrylate, dodecyl (meth)acrylate, 2-ethylhexyl (meth)acrylate, benzyl (meth)acrylate, lauryl (meth) acrylate, oleyl(meth)acrylate, palmityl (meth)acrylate, and stearyl (meth)acrylate; unsaturated vinyl esters of (meth) acrylic acid such as those derived from fatty acids and fatty alcohols; monomers derived from cholesterol; olefinic monomers such as 1-butene, 2-butene, 1-pentene, 1-hexene, 1-octene, isobutylene and isoprene; and the like, and copolymers or combinations thereof. Hydrophilic monomers, which improve the compatibility of the polymers of the latex and the latexes ability to resist stains, may include, but are not limited to, acrylic acid (AA), methacrylic acid (MAA), itaconic acid (IA), hydroxyethyl acrylate (HEA), hydroxyethyl. methacrylate, (HEMA), acetoacetoxyethyl methacrylate (AAEM), diacetone acrylamide (DAAM), vinyl acetate (VA) and the like, and copolymers and combinations thereof. Additionally, the hydrophilic monomers may enhance the coalescence of the self-coalescing latex by permitting water plasticization of the polymer. The polymers may also include wet adhesion monomers (WAM) such as monomers containing chelating or polar nitrogen functionalities including, but not limited to, acetoacetoxymethacrylate, allyl acetoacetate, methylolated diacetone acrylamide, and polymerizable aziridines, containing amino functional monomers including, but not limited to, β-dimethylaminoethyl methacrylate; containing ureido functionalities including, but not limited to, allylic and acrylic derivatives of hydroxyethylethyleneurea and amino ethylethyleneurea (such as Sipomer WAM II), and dihydroxy imidazolidinone, and containing urea and ureido functionalities as well. In addition, the polymers may include crosslinkable monomer or oxidatively crosslinkable monomers, i.e. monomers that crosslink at ambient conditions. The crosslinkable monomers may enhance the physical properties of the latex by permitting the crosslinking of the polymers within and between the layers (core, shell, and/or skin) upon drying or oxidation of the self-coalescing latex. Examples of crosslinkable monomers include, but are not limited to, DAAM, monoalkoxydialkyl vinyl silanes, dialkoxyalkyl vinyl silanes, trialkoxy vinyl silanes, monoalkoxy acrylic silanes, dialkoxy acrylic silanes, trialkoxy acrylic silanes, trialkoxy methacrylic silanes, monoalkoxy epoxy silanes, dialkoxy epoxy silanes or trialkoxy epoxy silanes, and the like, and copolymers and combinations thereof. Although hydrophobic, hydrophilic, and/or functional monomers may be present in any of the layers, the hydrophobic monomers are preferably used within the core, and the hydrophilic and functional monomers (especially WAM and crosslinking monomers) are preferably present within the shell polymer. These monomers, the hydrophobic, hydrophilic, functional (such as wet adhesion and crosslinking monomers) may be present in about 0-10% by weight, preferably about 0-7% by weight, and most preferably about 0-5% by weight of the respective layer and about the same for the self-coalescing latex of the current invention.

As noted above, the film forming monomers of the skin of the self-coalescing latex act as a thin plasticizer for the latex replacing conventional coalescent aids. As noted below, the skin of the self-coalescing latex is generated in situ and therefore the monomer composition of the skin is substantially the same as the monomer composition of the shell. However, one of ordinary skill in the art will appreciate that additional monomers, such as hydrophobic, hydrophilic, and/or functional monomers, preferably hydrophilic and crosslinking monomers, may be added contemporaneously with the chain transfer agent to enhance the desired properties of the self-coalescing latex. These additional monomers, if included, may be present in up to about 10% by weight, and preferably up to about 7% by weight, and most preferably about 5% by weight of the skin.

The polymers of the skin act as film forming polymers by acting as thin plasticizers that substantially influence the MFFT of the resulting latex through their nominal molecular weight. The average molecular weight (numerical or weighted) of the polymers of the skin is substantially smaller than that of either the core, (less than about 15% the weighted average molecular weight of the polymers of the core) or shell (less than about 25% the weighted average molecular weight of the polymers of the shell). In particular, the average molecular weight of the polymers of the skin are: number average molecular weight ($M_n$) is about 1,000 to about 15,000 Daltons, preferably about 3,000 to about 12,000 Daltons, and more preferably about 5,000 to about 10,000 Daltons; and weighted average molecular weight ($M_w$) is about 10,000 to 40,000 Daltons, preferably about 15,000 to 35,000 Daltons, and most preferably about 20,000 to 30,000 Daltons. The polydispersity index (PDI) for the polymers of the skin is about 2 to 6, preferably about 2 to 4.5, and most preferably about 2 to 3.

On the whole, the average molecular weight for the self-coalescing latex is: number average molecular weight ($M_n$) is about 15,000 to about 45,000 Daltons, preferably about 20,000 to about 40,000 Daltons, and more preferably about 25,000 to about 35,000 Daltons; and weighted average molecular weight ($M_w$) is about 125,000 to 225,000 Daltons, preferably about 150,000 to 200,000 Daltons, and most preferably about 160,000 to 190,000 Daltons. The polydispersity index (PDI) for the polymers of the skin is about 3 to 9, preferably about 4 to 8, and most preferably about 5 to 7.

As a whole, the latex may contain 10-50 wt. % of monomers responsible for hardness, 10-60 wt. % of monomers responsible for softness, and 0-10% of hydrophobic, hydrophilic, functional and cross-linking monomers. Additionally, the polymers of the core may contain 10-50% by weight of the latex, the polymers of the shell may comprise 10-60% by weight of the latex, and the polymers of the skin may comprise about 0.5-10% by weight of the self-coalescing latex. Preferably the skin polymers may comprise about 2-10%, and most preferably about 5-10% by weight of the latex.

In one preferred embodiment, the sequentially designed self-coalescing latex of the current invention has a core comprised of a polymer having MMA, a shell comprised of mainly of BA or 2-EHA and about 0-5% of DAAM (crosslinker), WAM, and MAA (to assist with formation of skin and dispersal of film forming polymers (skin) throughout the applied self-coalescing latex), and a shell comprised of a polymer substantially similar to the shell polymer but having a substantially smaller molecular weight (less than about 25% of the weighted average molecular weight of either the polymers of the core or shell).

The self-coalescing latexes of the current invention are preferably substantially acrylic, and preferably solely acrylic.

In another variation, the glass transition temperature ($T_g$) may also be used to characterize the self-coalescing latex. When the polymers in the core, the shell, or the coating are copolymers, the overall $T_g$ of a particular layer of copolymers can be calculated by applying the $T_g$ value of the homopolymer derived from each monomer to the Fox Equation:

$$(1/T_g) = (W_a/T_{ga}) + (W_b/T_{gb}) + \ldots + (W_i/T_{gi}), \text{ wherein}$$

$W_1, W_2, \ldots$ and $W_i$=weight percentages of monomers "a", "b", ..., and "i"

$T_{ga}, T_{gb} \ldots$ and $T_{gi}=T_g$ values of monomers "a", "b", ..., and "i"

See U.S. Pat. No. 6,723,779 and International Publication No. WO 94/04581 for the application of the Fox Equation to the calculation of the $T_g$ values of copolymers. The disclosure of the '779 patent and the '581 publication are incorporated herein by reference in their entireties. In general, the $T_g$ is influenced by the types of monomers used within a polymer and thus although the polymers of the core and shell have similar average molecular weights their $T_g$s are vastly different. The core which is comprised of substantially hydrophilic or neutral monomers exhibits a higher $T_g$ than the shell. In particular, the Tg for the core polymers should be greater than 50° C., alternatively the glass transition temperature should be about 50° C. to 130° C., preferably about 70° C. to about 110° C. The shell, which is comprised largely of hydrophilic monomers exhibits a $T_g$ less than that of the core: specifically, the $T_g$ for the shell should be less than about 50° C. but more than −10° C., alternatively the glass transition temperature should be about −10° C. to 50° C., preferably about 10° C. to about 40° C. Also, the Tg of the polymers of the skin is less than 0° C., alternatively the glass transition temperature should be about −40° C. to 0° C., preferably about −30° C. to −10° C. To be useful for low VOC or zero VOC paint compositions while maintaining outstanding paint properties, the latex of the invention uses monomers that form polymers with different $T_g$ for the core, the shell, and the skin. Specifically, monomers for the core are those that form polymers of relatively higher $T_g$ and monomers for the shell are those that form polymers of relatively lower $T_g$ in order to avoid poor paint properties such as poor block resistance and dirt pick up.

In an alternative variation of the current embodiment, there can be intermediate layers between the core and shell and the shell and skin of the inventive latex. For the intermediate layer(s) between the core and shell, the (numerical/weighted) average molecular weight and $T_g$ should be between those of the polymers of the core and the shell. These intermediate layers may also add to the diversity of paint finishes while maintaining the desirable paint properties such as block resistance, and low temperature coalescence. Further one of ordinary skill in the art will appreciate that the relative positions of the core and shell can be internal and external, respectively, as well as neighboring (side-by-side or dumbbell shaped). Moreover, the skin of the self-coalescing latex may be either a partial or complete coating over the core and shell of the latex, and preferably is a complete coating.

Although a sequentially polymerized polymer is disclosed above, an alternative embodiment of the invention relates to self-coalescing latexes of linear polymers including, but not limited to, random, block and/or branched polymers including the hard and soft monomers with the low molecular weight co-film formers disclosed above. These monomers are preferably present within the linear polymers in the proportions disclosed above.

The second embodiment of the invention is directed to the process of making the self-coalescing latex by polymerization.

Polymerization can be categorized according to the homogenous or heterogenous nature of the system. Polymerization in homogenous systems can be conducted in batch, continuous, or solution mode. Polymerization in a heterogenous system can be executed in suspension or emulsion mode. Parameters for such polymerizations are known in the art, see "Chapter 6: Polymerization Conditions and Polymer Reactions" in Textbook of Polymer Science, Third Edition, F. W. Billmeyer, Jr. (Ed), the disclosure of which is incorporated herein by reference, and are further disclosed in Example 1 below. In either instance, the polymerization process of the current invention involves the use of a large portion on chain transfer agent with the last about 1-15%, preferably about 5-10%, of the pre-emulsion monomer solution in the polymerization to generate the film forming monomers that have low molecular weight.

To generate the sequential polymerized latex of the current invention a sequential emulsion polymerization constructs a core, a shell and a skin/coating with appropriate monomers. By the addition of a substantial amount of chain transfer agent to a remaining portion of the shell monomer pre-emulsion prior to polymerization advantageously generates a coating/skin on the shell comprised of film forming polymers, i.e. polymers substantially similar to the shell polymers with substantially lower molecular weights. As noted, above these film forming polymers act as thin plasticizers thereby eliminating the need for a separate coalescing agent and further maintains the mechanical properties of the dried latex film such as block resistance, open time, water-softening resistance, and other advantageous properties.

In one aspect, the latex is sequentially polymerized in at least three stages so as to form at least three distinct phases: the first phase of a core, the second phase of a shell, and the third phase of a coating/skin, whereby the core is the result of a first polymerization of a core monomer pre-emulsion, the shell is the result of a second polymerization of a substantial portion of the shell monomer pre-emulsion, and the coating is the result of a third polymerization of a remaining portion of the shell monomer pre-emulsion which has been charged with a substantial amount of chain transfer agent.

The skin, film forming polymers, of the current invention is largely due to the last steps of the sequential polymerization process. In the novel polymerization process of the current invention, a chain transfer agent, an agent having at least one weak chemical bond that interferes with the growing polymer chain, is added to the last portion of the shell monomer pre-emulsion. The chain transfer agent thereby limits the weighted average molecular weight of the resulting polymers to a weighted average molecular weight of less than about 40,000 daltons. Suitable chain transfer agents include, but are not limited to, halogenated hydrocarbons (halomethanes, chloroform, carbon tetrachloride, carbon tetrabromide, and bromotrichloromethane), thiols (mercapatol, methylthioglycol, isooctyl 2-mercaptopropionate, and isooctylmercaptopropionate), aromatic mercaptans, long chain alkylmercaptans, or disulfides. Preferably the chain transfer agent is isooctylmercaptopropionate (IOMP). About 0.5 to 7% by weight of the chain transfer agent may be charged to the remaining portion of the shell monomer pre-emulsion, preferably about 1-5% by weight, and most preferably about 2-3% by weight. The chain transfer agent is charged to the remaining 0.5-15%, preferably the remaining 2-12.5%, and most preferably about 5-10% of the shell monomer pre-emulsion.

In the preparation of emulsion polymers, conventional surfactants may be used. Examples of surfactants useful in the preparation of the emulsion according to the invention can include, but are not limited to, nonionic and/or anionic surfactants such as anionic and/or nonionic emulsifiers such as alkali or ammonium alkyl sulfates, alkyl sulfonic acids, fatty acids, oxyethylated alkyl phenols, ammonium nonoxynol-4 sulfate, nonylphenol ethoxylate(10), octylphenol ethoxylate(9-10), sodium dodecylbenzene sulfonate, sodium dodecyl sulfonate, sodium tetradecyl sulfonate, sodium hexadecyl sulfonate, those sold under the tradename Triton™ (e.g., QS series, CF series, X series, and the like), those sold under the tradename Igepal™, those sold under the tradename Rhodapon™, those sold under the tradename Rhodapex™, those sold under the tradename Rhodafac™, those sold under the tradename Rhodacal™, and the like, and combinations thereof. Either thermal or redox initiation processes may be used to initiate the polymerization. Conventional free radical initiators may be used such as, for example, hydrogen peroxide, t-butyl hydroperoxide, and ammonium, sodium, or alkali persulfates, potassium persulfate, redox systems such as sodium hydroxymethanesulfmate (reducer) and t-butyl-hydroperoxide (oxidizer), and the like, and combinations thereof. Either or both of these components can optionally contain an additional surfactant and/or a pH adjustor, if desired to stabilize the emulsion.

An example of an emulsion polymerization in accordance with the current invention is provided in Example 1, below.

The first phase of the sequential polymerization may comprise about 0.1-50 wt % of the latex, preferably about 10-50 wt %, and more preferably about 20-45 wt %. The second phase of the sequential polymerization may comprise about 10-60 wt % of the latex, preferably about 20-55 wt %, and more preferably about 30-50 wt %. The third phase of the sequential polymerization may comprise about 0.5-10 wt % of the latex, preferably about 2-9 wt %, and more preferably about 4-9 wt %.

By controlling the monomers in each phase of the multistage sequential emulsion polymerization, the latex of the invention will contain 10-50 wt % of monomers responsible for hardness, 30-60 wt % of monomers responsible for softness, and about 0-10 wt % of monomers rendering hydrophobic, hydrophilic and functional groups to the latex.

The third embodiment of the invention involves a paint composition comprised of the self-coalescing latex of the current invention that is substantially free of coalescing agents. A paint composition containing the self-coalescing latex according to the invention can be formulated according to the following method. First, a pigment dispersion composition, or grind, is formed by: combining an organic solvent, water, a dispersant, a pH adjustor, a surfactant, a defoamer, a colorant/pigment, and a biocide/preservative; stirring and optionally grinding for a period of time to sufficiently mix the ingredients; and, while continuing to stir and/or grind, adding more water. To this pigment dispersion composition can be added a self-coalescing latex according to the invention, followed by a pH adjustor, if desired, and a performance additive composition comprising, but not limited to, an organic solvent, a surfactant, and a defoamer. Optionally but preferably, an anticorrosive solution can then be added. Then, a rheology modifier can be added, optionally including more water, if desired, and also a pH adjustor, thus forming a paint composition. Furthermore, if desired, more colorant(s) and/or pigment(s) can be added to the paint composition either to compliment the (white) pigment(s)/colorant(s) already in the pigment dispersion composition or to add another desired color to the paint composition. Further additives listed in "2010 Additives Handbook" by Darlene Brezinski et al., Jun. 4, 2010 published by the Paint and Coatings Industry, hereby incorporated by reference in its entirety, may be incorporated into the paint composition of the current invention.

Preferably the paint composition is a Low-VOC or Zero-VOC composition. According to U.S. Environmental Protection Agency (EPA) Method 24, which defines VOC, "Low-VOC" compositions and components can have a VOC content of not more than about 250 g/L (about 25% w/v), preferably not more than about 150 g/L (about 15% w/v), more preferably not more than about 100 g/L (about 10% w/v), most preferably not more than about 50 g/L (about 5% w/v), for example not more than about 30 g/L (about 3% w/v) or not more than about 20 g/L (about 2% w/v). "Zero-VOC" compositions can also be part of the low-VOC compositions of this invention. Zero-VOC compositions can advantageously have a VOC content of not more than about 10 g/L (about 1% w/v), preferably not more than about 8 g/L (about 0.8% w/v), more preferably not more than about 5 g/L (about 0.5% w/v), for example not more than about 2 g/L (about 0.2% w/v).

Although the current invention relates to self-coalescing latexes in less preferred embodiments additional coalescing agents in particular low- or no-VOC coalescing agents may be incorporated into the paints of the current invention provided they do not interfere with the current inventions synergistic enhancement of the physical properties of resulting film. Examples of low-VOC coalescing agents can include, but are not limited to, fatty acid alkylene glycol monoesters (e.g., those compounds sold under the tradename Archer RC™ from Archer Daniels Midland), aromatic alkoxylates (e.g., cresol propoxylates such as those compounds sold under the tradename PLURACOAT™, including PLURACOAT™ CA120, PLURACOAT™ CA110, and PLURACOAT™ CA100), those compounds sold under the tradename EDENOL™ from Cognis (e.g., EDENOL™ EFC 100), those compounds sold under the tradename OPTIFILM™ from Eastman Chemical (e.g., OPTIFILM™ Enhancer 400), and the like, and combinations thereof. While less preferred, the low-VOC composition can contain traditional (VOC) coalescence solvents, which can include, but are not limited to, 2-ethylhexyl ether of ethylene glycol (e.g., commercially available from Eastman Chemical as Eastman™ EEH solvent), alkyl esters of aromatic carboxylic acids (e.g., 2-ethylhexyl benzoate and/or those compounds sold under the tradename Velate™ 368 from Velsicol Chemical Corp.), methyl carbitol, propylene glycol, ethylene glycol, optionally-alkyl-substituted alkanediol organic carboxylic acid monoesters (e.g., 2,2,4-trimethyl-1,3-pentanediol monoisobutyrate and those compounds sold under the tradename Texanol™ from Eastman Chemical), phosphate salts such as potassium tetrapyrophosphate, plasticizers such as dibutyl phthalate, and the like, and combinations thereof.

The amounts of low-VOC coalescing agent(s) used for the paints derived from the latex of the invention may be in the range of about 0.01 to 10 wt %, preferably from about 0.02 to 8 wt %, more preferably from about 0.05 to 7 wt %, most preferably from about 0.1 to 5 wt %.

Open time agents for latex coating compositions are typically compounds having a relatively low molecular weight (e.g., a number average molecular weight from about 1,000 Daltons to about 100,000 Daltons) and containing a relatively high content of hydrophilic functional groups (e.g., hydroxyls, carboxylic acids, and the like, and combinations thereof). In the case of acrylic-based and/or acrylic-/styrenic-based polymer coating compositions, open time agents can generally also be acrylic-based. The relatively high concentration of hydrophilic functional groups can, in some cases, advantageously give open time agents a relatively large hydroxyl number (e.g., at least about 100) and/or acid number. The relatively high concentration of hydrophilic functional groups can also advantageously cause a paint composition, for example, containing the open time agent to have the function of maintaining its viscosity, fluidity, flowability, re-wettability and/or brushability for extended periods of time, e.g., to allow a consumer/user sufficient time to coat a surface relatively smoothly and relatively evenly.

Examples of low-VOC open time agents can include, but are not limited to, those compounds sold under the tradenames FLOTROL™, FLOETROL™, and/or FLUOTROL™, e.g., from the Flood Company of Hudson, Ohio, those compounds sold by Morgan Associates of Hometown, Pa. under the tradename WONDERWET™, and the like, and combinations thereof.

The amount of low-VOC open time agents in the paints derived from the latex of the invention may be in the range of about 0.01 to 10 wt %, preferably from about 0.02 to 8 wt %, more preferably from about 0.05 to 7 wt %, most preferably from about 0.1 to 5 wt %.

Examples of pH adjustors useful in the compositions according to the invention can include, but are not limited to, ammonium hydroxide, sodium hydroxide, sodium carbonate, sodium bicarbonate, potassium hydroxide, potassium carbonate, potassium bicarbonate, ammonium salts, ammonia, amines, aminoalcohols (e.g., 2-amino-2-methyl-1-propanol and/or those compounds sold under the tradename AMP™ 95 by Angus Chemical Co.), and the like, and combinations thereof. Preferred pH adjustors include ammonia, amines and aminoalcohols. In certain cases, compounds that qualify as pH adjustors can be added for purposes other than adjusting pH (e.g., temporary deactivation of otherwise reactive functional groups, emulsion stabilization, or the like), and yet are still characterized herein as pH adjustors.

The compositions according to the invention can advantageously exhibit a pH from about 6 to 10, preferably from about 7 to 9.5, more preferably from about 8 to 9.5, although the pH needs only to be sufficient to maintain the stability of the particular composition, in combination with any additives present.

Low-VOC crosslinking agents (and crosslinking agents, in general) can typically include at least one crosslinkable functional group (and usually at least two crosslinkable functional groups) capable of reacting with a corresponding reactive (crosslinkable functional) group on another molecule. Non-limiting examples of crosslinkable functional groups include epoxies, silanes, silane ethers, amines, hydroxyls, carboxylic acids, carboxylates, amides, urethanes, thiourethanes, ureas, thioureas, isocyanates, isothiocyanates, acid halides, aldehydes, anhydrides, and the like, and combinations thereof. In a preferred embodiment, the low-VOC crosslinking agent contains both a silane ether functional group and an epoxy functional group (i.e., an epoxysilane). In another preferred embodiment, the crosslinking agent does not include, and in some preferred embodiments specifically excludes, any compound and/or functional group that participates in, facilitates, or catalyzes oxidative crosslinking (e.g., atmospheric oxygen can cause oxidative crosslinking of pendant ethylenic unsaturations and other residual hydrocarbon double bonds). In another embodiment, the crosslinking agent does not include, and in some embodiments specifically excludes, organometallic catalysts (e.g., titanium carboxy-esters that can ester exchange with crosslinkable groups such as silanes to activate a crosslinking reaction).

The low-VOC crosslinking agents in the paints derived from the latex of the invention may be in the range of about 0.01 to 20 wt %, preferably from about 0.02 to 15 wt %, more preferably from about 0.05 to 10 wt %, most preferably from about 0.1 to 8 wt %.

Crosslinking agents, coalescing agents, and open-time agents that are characterized as being low-VOC typically exhibit a higher molecular weight than other (standard) agents of a similar type, typically contain an increased number of functional groups than other (standard) agents of a similar type, or both. Preferred coalescing agents include those that, regardless of molecular weight, contain at least one or two functional groups capable of reacting with the crosslinking agents present in the compositions according to the invention. Similarly, preferred open time agents include those that, regardless of molecular weight, contain at least two functional groups capable of reacting with the crosslinking agents present in the compositions according to the invention.

The types of finishes of the paints using the latex of the invention can be high gloss, semi-gloss, satin or "silk", eggshell, or flat. The degree of shininess, or gloss, is determined by the amount of pigment present in the paint. Without any pigment, most binders will yield a high gloss finish. Gloss is measured in reflectivity of the painted surface at 20°, 60°, and 85° from the vertical position.

TABLE 1

The Typical Reflectivity of Paints with Different Gloss At Different Angles Type of Paint

| Type of Paint | 20° Gloss | 60° Gloss | 80° Gloss |
|---|---|---|---|
| High Gloss | 20-90 | 70-95 | — |
| Semi-Gloss | 5-45 | 25-75 | — |
| Satin | — | 5-25 | 10-40 |
| Eggshell | — | 2-15 | 5-25 |
| Flat | — | 0-10 | 0-15 |

Pigment volume concentration ("PVC") can also be used to describe the paint in terms of the volume of the pigment and the volume of the binder. Therefore, the percentage of PVC ("PVC %") can be calculated using the equation:

$$PVC\% = [(\text{Volume of Pigments})/(\text{Volume of Pigments} + \text{Volume of Binder})] \times 100$$

TABLE 2

The Typical PVC % Values of Different Types of Finishes

| Type of Paint | PVC % |
|---|---|
| High Gloss | 15 |
| Semi-Gloss | 25 |
| Satin | 35 |
| Eggshell | 35-45 |
| Flat | 38-80 |

Examples of initiators and chaser solutions useful in the latex compositions according to the invention can include, but are not limited to, ammonium persulfate, sodium persulfate, potassium persulfate, redox systems such as sodium hydroxymethanesulfinate (reducer) and t-butyl-hydroperoxide (oxidizer), and the like, and combinations thereof, typically in an aqueous solution. Either or both of these components can optionally contain an additional surfactant and/or a pH adjustor, if desired to stabilize the emulsion.

Examples of surfactants useful in the paint compositions according to the invention can include, but are not limited to, nonionic and/or anionic surfactants such as ammonium nonoxynol-4 sulfate, nonylphenol ethoxylate(10), octylphenol ethoxylate(9-10), sodium dodecylbenzene sulfonate, sodium dodecyl sulfonate, sodium tetradecyl sulfonate, and sodium hexadecyl sulfonate, those sold under the tradename Triton™. (e.g., QS series, CF series, X series, and the like), those sold under the tradename Igepal™, those sold under the tradename Rhodapon™, those sold under the tradename Rhodapex™, those sold under the tradename Rhodafac™, those sold under the tradename Rhodacal™, and the like, and combinations thereof.

Examples of dispersants useful in the paint compositions according to the invention can include, but are not limited to, 2-amino-2-methyl-1-propanol, hydrophobic copolymers such as Tamol™ 165A, Tamol™ 1124, and combinations thereof.

Examples of preservatives or biocides useful in the paint compositions according to the invention can include, but are not limited to, hydroxy-functional aza-dioxabicyclo compounds such as those commercially available from ISP under the tradename Nuosept™ 95.

Examples of defoamers useful in the paint compositions according to the invention can include, but are not limited to, polysiloxane-polyether copolymers such as those sold by Tego under the tradename Foamex™, those sold under the tradename BYK™, those sold under the tradename Drewplus™, those sold under the tradename Surfynol™, and the like, and combinations thereof.

Examples of anticorrosive agents useful in the paint compositions according to the invention can include, but are not limited to, sodium nitrite and the like.

Examples of rheology modifiers useful in the paint compositions according to the invention can include, but are not limited to, those commercially available from Rohm & Haas under the tradename Acrysol™, such as RM-2020 NPR and RM-825.

While typically multiple pigments/colorants are present in end-use latexes that are to be used in paint or architectural coating applications, sometimes only a white pigment, such as a zinc oxide and/or a titanium oxide, is added in the early stages of the formation of the paint composition (e.g., in the base composition). In such a case, any other desired pigments/colorants of various colors (including more white pigment) can optionally be added at the later stages of, or after, formation of the paint composition. Examples of pigments/colorants useful according to the invention can include, but are not limited to, carbon black, iron oxide black, iron oxide yellow, iron oxide red, iron oxide brown, organic red pigments, including quinacridone red and metallized and non-metallized azo reds (e.g., lithols, lithol rubine, toluidine red, naphthol red), phthalocyanine blue, phthalocyanine green, mono- or di-arylide yellow, benzimidazolone yellow, heterocyclic yellow, DAN orange, quinacridone magenta, quinacridone violet, and the like, and any combination thereof. These exemplary color pigments can be added as powders, but can more conveniently be added as aqueous dispersions to paint compositions according to the invention. Suitable pigments can be either organic or inorganic.

Additionally or alternately, extender pigments/colorants can be added, e.g., to the grind composition portion of the paint composition. Examples of extender pigments/colorants useful in the paint compositions according to the invention can include, but are not limited to, silica, silicates carbonates such as calcium carbonates, and the like, and combinations thereof. The paint compositions containing the self-coalescing latex according to the invention can exhibit a wide range of viscosities, depending upon the application. In one embodiment, the viscosity of the sequentially polymerized latex can be from about 65 to about 130 Kreb units (KU), preferably from about 70 to about 110 KU, more preferably from about 75 to about 105 KU. While coalescence, degradation, and other factors can cause the viscosity to increase over time, it is preferable that the viscosity not increase beyond about 130 KU, preferably not beyond about 120 KU, more preferably not beyond about 115 KU, and in some cases not beyond about 110 KU.

Advantageously, the paint compositions containing the self-coalescing latex according to the invention can exhibit good viscosity stability after composition preparation, while sitting "on the shelf". Maintaining viscosity stability is desirable to maintain shelf-life and can lead to good shelf stability. Shelf stability can be quantified in many ways. For instance, when measuring viscosity stability, a significant increase in the viscosity from just after composition preparation to as long as 30 days thereafter at ambient temperature (e.g., between about 20° C. and about 30° C.) can indicate a poor shelf stability. In another example measuring incubation stability, a significant increase in the viscosity from just after composition preparation to as long as 30 days thereafter at elevated temperature (e.g., about 120° F.) can indicate a poor shelf stability.

In one preferred embodiment, the viscosity increase between the paint composition prepared soon after polymerization and the paint composition after 30 days at elevated temperature is not more than about 20 KU, preferably not more than about 15 KU, more preferably not more than about 10 KU, and in some cases not more than about 5 KU. In another preferred embodiment, the viscosity increase between the paint composition prepared soon after polymerization and the paint composition after 30 days at elevated temperature is not more than about 25 KU, preferably not more than about 20 KU, more preferably not more than about 15 KU, most preferably not more than about 10 KU.

The latexes and/or paint compositions containing the self-coalescing latex according to the invention can advantageously exhibit a pH from about 6 to about 10, although the pH needs only to be sufficient to maintain the stability of the particular latex and/or paint composition in combination with the surfactant(s) and other stabilizing components.

EXAMPLES

The following Examples are merely illustrative of certain embodiments of the invention. The following Examples are not meant to limit the scope and breadth of the present invention, as recited in the appended claims.

Example 1

Polymerization of Self Coalescing Latex

Sequentially Designed Latex Suitable of Paint with Semi-Gloss Finish

Sequential emulsion polymerization was performed in a 5-liter round bottom reactor equipped with an agitator, a thermocouple, a monomer pre-emulsion feed, an initiator feed, a condenser, and a nitrogen purge system. The temperature of the reactor was maintained by utilizing a water bath. The reactor was charged with 370.0 g of deionized (DI) water, 1.0 g of sodium bicarbonate, 1.6 g of Rhodacal A-246/L as sulfonate-based surfactant. The reactor was immersed in the water bath at 65° C. and the content was stirred for 20 minutes under nitrogen purge.

The monomer pre-emulsion for the latex was prepared by adding 280.0 g of DI water, 32.0 g of Rhodafac 610A-25 as phosphate-based surfactant, 10.0 g of Rhodacal A-246/L as sulfonate-based surfactant, 416.0 g of methyl methacrylate as monomers responsible for hardness, 288.0 grams of butyl acrylate as monomers responsible for softness, 6.0 g of methacrylic acid as monomers for hydrophilic and functional group purposes, and 12.0 g of Rohamere 6844-0 for wet adhesion.

For a core formation, 42.0 g of the monomer pre-emulsion was charged to the reactor followed by a solution of 1.5 g of sodium persulfate as free radical initiator in 15.0 g of DI water, and then nitrogen purge was stopped. A feed of the monomer pre-emulsion for the core was started and continued over a period of 210 minutes.

105 minutes after monomer pre-emulsion feed was started, components of the shell were added to monomer pre-emulsion: 32.0 g of Rohamere 6844-0 for wet adhesion, 88.0 g of butyl acrylate as monomers responsible for softness, and 2.0 g of methacrylic acid as monomers responsible for hydrophilic and functional group purposes. At this point a feed of a solution of 1.0 g of sodium persulfate as free radical initiator in 64.0 g of water started over a period of 110 minutes.

After all feed were completed, the reaction was heated to 82° C. for an additional 45 minutes. When about 90% of the shell pre-emulsion monomer solution had been fed into the reaction, 3% by weight of the chain transfer agent IOMP was fed into the reaction with the remaining pre-emulsion monomer solution as well as an initiator solution. Afterwards, the reaction was cooled to 52° C. and a solution of 0.6 g of sodium formaldehyde sulfoxylate as a reductant in the chaser in 16.0 g of DI water was added followed by a solution of 0.8 g of 70% tert-butyl hydroperoxide as oxidizer in the chaser in 16.0 g of DI Water. After cooling to ambient temperature, the pH of the latex was adjusted to 8.5 by ammonia solution, and the latex was filtered. The distribution of the monomers from the core, shell, and skin were 1233 g (44.72%), 1312 g (47.48%), and 212 g (7.70%).

Further the molecular weight of the latex as well as the molecular weights and PDIs of the layers are listed in the table below.

TABLE 3

Molecular Weights

|  | $M_n$ | $M_w$ | $M_z$ | PDI |
|---|---|---|---|---|
| Latex | 31231 | 177986 | 751260 | 5.699 |
| Core | 44682 | 223739 | 1147761 | 5.007 |
| Shell | 35096 | 126340 | 405264 | 3.600 |
| Skin | 9127 | 26857 | 55033 | 2.942 |

The paint made with this latex has very good coalescence at 4° C., and very good paint properties such as wet adhesion, block resistance, stain removal, and scrub resistance.

Latexes prepared according to Examples 1-3 were tested for minimum film formation temperatures (MFFT). MFFT were determined by the use of an instrument MFFT Bar-90 according to ASTM D2354-98 (Standard Test Method for Minimum Film Formation Temperature of Emulsion Vehicles). Temperature range was between 0° C. (the cold end) and 18° C. (the warm end). Emulsions were applied using 75 micron cube applicator from the warm end on the right to the cold end on the left to form tracks. Emulsions were allowed to dry for 3 hours. When films have formed, the MFFT were determined as points on tracks where the film has coalesced over 90% of the track width. For all the inventive latexes tested, the MFFT were about 0.5 to 2° C.

Block resistance, or the propensity of a coating to adhere to itself instead of to its substrate, was measured according to a modified version of ASTM D4946. On a sealed white Leneta™ WK card, three 9"-wide draw down coatings of samples of about 3 mils thickness were prepared side by side and allowed to cure for about 1 week at room temperature (e.g., from about 20-25° C.). After curing, each of the three draw down coating samples was cut into four 1" squares. Two of these squares were oriented face to face (i.e., coated sides touching) and are placed under a 100-gram weight in a 120° F. oven for about 24 hours. The other two of these squares were oriented face to face and placed under a 100-gram weight at room temperature for about 24 hours. Both sets of face to face squares were then allowed to equilibrate to ambient temperature for about ½ hour. Each set of squares was then pulled apart using a slow and steady force, forming a T pattern. Block resistance was rated on a scale of 1 to 5, with 1 representing no tackiness (which includes both the sound and the feel of separation upon peeling), 2 representing a slight tackiness, 3 representing a moderate tackiness, 4 representing a high level of tackiness, and 5 representing transfer of at least a portion of one of the coatings away from its substrate and onto the other coating. The relative percentage of transfer of the coating was also noted.

Scrub resistance was measured according to a modified version of ASTM D2486 Method B. A scrub panel was created with three 9"-wide draw down coatings of samples of about 7 mils thickness prepared side by side (at least one of the samples should be a control sample) and allowed to cure horizontally for about 2 weeks at room temperature (e.g., from about 20-25° C.). Black scrub panels were preferably used for coating compositions that are white, pastel, and medium colors. In addition, an extra scrub panel was used as a conditioning panel. On a Gardner™ Abrasion Tester, the night before testing, a medium bristle brush was soaked in DI water overnight. Just before the testing, the excess water was shaken from the brush, and the brush was placed in the brush holder. Before testing the scrub panels, the conditioning panel was secured in the Gardner™ Abrasion Tester. With a wooden tongue depressor, about 10 grams of abrasive scrub medium was applied to the brush, and about 5 cc of DI water was syringed evenly across the panel in the area to be scrubbed. The conditioning panel was scrubbed for about 400 cycles. Thereafter, the conditioning panel was removed and discarded, the brush was washed with water, and each scrub panel was secured in the Gardner™ Abrasion Tester. Like with the conditioning panel, the abrasive scrub medium was applied to the brush, and the water was applied to the panel. The scrub panel was then scrubbed for a maximum of about 2000 cycles (typically about 1 hour). About every 100 cycles, excess scrub medium was moved from outside the scrub area to inside the scrub area. About every 400 cycles, another 10 grams of scrub medium is added to the brush, and another 5 cc of DI water was syringed onto the scrub area. The number of cycles it took to remove one continuous line of each coating was noted. This process was repeated for each scrub panel.

Water resistance tests were performed using controlled condensation conditions according to ASTM D4585-99. Using a 3-mil bar, test and control paints on a sealed DD card are drawn down. The paints are allowed to air dry for 24 hours. To test for water resistance, the DD card is laid horizontally, and 3 drops of water are added to each sample and allowed to soak for one minute. The samples are blotted dry and scratched with a finger nail. Blisters are visually checked. Samples are evaluated as equal to, better than or worse than the control.

Low-temperature coalescence was measured according to a modified version of ASTM D3793. For each sample, a number of 6"×12" Upson panels were cooled to about 40° F. for about 1 hour. On one half (6"×6" portion) of each panel, a draw down coating of each composition was prepared having a thickness starting at about 3 mils and going to about 24 mils. These panels were then kept about 40° F. in a refrigerator for about 24 hours, and were allowed to recover for about ½ hour at room temperature, after which point the panels were left overnight. The presence or absence of visible cracks on each panel was noted and rated from 3 to 24, based on the thinnest panel on which cracks were first evident, with each number represent its mil-thickness, and with 24 representing that either only the 24-mil thick panel or none of the panels showed cracks.

While various embodiments of the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment.

The invention claimed is:

1. A self-coalescing latex comprising a sequentially designed polymer comprised of at least
   from about 10 to about 50% by weight of hard monomers forming a first stage of the latex having a glass transition temperature from about 50° C. to about 130° C., from about 10 to about 60% by weight of soft monomers forming a second stage of the latex having a glass transition temperature from about −10° C. to about 50° C., and from about 0 to about 10% by weight of hydrophilic, hydrophobic or functional monomers wherein the film forming polymer further comprises a film forming polymer having a weighted average molecular weight of less than about 40,000 Daltons and is present in about 0.5% by weight to less than about 10% by weight of the polymer.

2. The self-coalescing latex of claim 1, wherein the film forming polymer forms a third stage of the sequentially designed polymer.

3. The self-coalescing latex of claim 2, the first stage comprises a core of the sequentially designed polymer, the second stage comprises a shell of the sequentially designed polymer, and the third stage comprises a skin of the sequentially designed polymer.

4. The self-coalescing latex of claim 3, wherein the core has a weighted average molecular weight between about 175,000 to about 250,000 Daltons.

5. The self-coalescing latex of claim 4, wherein the core has a weighted average molecular weight of between about 190,000 to about 240,000 Daltons.

6. The self-coalescing latex of claim 3, wherein the core has a glass transition temperature of about 70 to about 110° C.

7. The self-coalescing latex of claim 1, wherein the hard monomers comprise at least one of methacrylic monomers, acrylonitrile monomers, styrene monomers, vinyl halide monomers, and vinyl acetate monomers.

8. The self-coalescing latex of claim 1, wherein the hard monomer comprises methyl methacrylate.

9. The self-coalescing latex of claim 3, wherein the core is further comprised of hydrophobic monomers.

10. The self-coalescing latex of claim 3, wherein the core comprises about 10 to 50% of the latex.

11. The self-coalescing latex of claim 3, wherein the shell has a weighted average molecular weight between about 75,000 to about 175,000 Daltons.

12. The self-coalescing latex of claim 11, wherein the shell has a weighted average molecular weight between about 90,000 to about 150,000 Daltons.

13. The self-coalescing latex of claim 3, wherein the shell has a glass transition temperature in the range of about 10 to about 40° C.

14. The self-coalescing latex of claim 1, wherein the soft monomers comprise at least one of acrylic monomers, vinyldiene halide monomers, alkylene monomers, and glycidyl acrylate monomers.

15. The self-coalescing latex of claim 1, wherein the soft monomers comprise at least one of ethyl acrylate, butyl acrylate, butyl methacrylate, and 2-ethylhexy acrylate.

16. The self-coalescing latex of claim 3, wherein the shell is further comprised of hydrophilic monomers and functional monomers.

17. The self-coalescing latex of claim 16, wherein the functional monomers comprise crosslinking or wet adhesion monomers.

18. The self-coalescing latex of claim 3, wherein the shell comprises about 20 to about 60% of the latex.

19. The self-coalescing latex of claim 3, wherein the skin has a weighted average molecular weight that is less than about 25% of the weighted average molecular weight of the shell.

20. The self-coalescing latex of claim 3, wherein the skin has a weighted average molecular weight of about 10,000 to about 40,000 Daltons.

21. The self-coalescing latex of claim 20, wherein the skin has a weighted average molecular weight of about 15,000 to about 35,000 Daltons.

22. The self-coalescing latex of claim 3, wherein the skin comprises about 0.5 to about 10% of the latex.

23. The self-coalescing latex of claim 1, wherein the sequentially designed polymer has a minimum film forming temperature between about −5° C. to about 5° C.

24. A sequential emulsion polymerization method for the self-coalescing latex of claim 1 comprising the steps of:
preparing a monomer pre-emulsion mixture for the first stage,
preparing a monomer pre-emulsion mixture for the second stage,
initiating polymerization of the monomer pre-emulsion mixture for the first stage to form the first stage,
treating the first stage with a substantial portion of the monomer pre-emulsion for the second stage to form the second stage,
charging a remaining portion of the monomer pre-emulsion for the second stage with a chain transfer agent, and
treating the second stage with the remaining portion of the monomer pre-emulsion for the second stage to form a third stage, wherein the weighted average molecular weight of a polymer of the third stage is substantially less than the weighted average molecular weight of a polymer of the second stage.

25. The sequential emulsion polymerization method of claim 24, wherein the remaining portion of the second stage monomer pre-emulsion for the third stage is about 10% of the monomer pre-emulsion for second stage.

26. The sequential emulsion polymerization method of claim 24, wherein the chain transfer agent is selected from halomethanes, chloroform, carbon tetrachloride, carbon tetrabromide, bromotrichloromethane, mercaptol, methylthioglycol, isooctyl 2-mercaptopropionate, isooctylmercaptopropionate, aromatic mercaptans, or disulfides.

27. The sequential emulsion polymerization method of claim 24, wherein the chain transfer agent is isooctylmercaptopropionate.

28. The sequential emulsion method of claim 24, wherein about 2-about 3% by weight of the chain transfer agent is added to the monomer pre-emulsion for shell.

29. A paint composition comprising the self-coalescing latex of claim 1 that is substantially free of coalescing agents.

30. The paint composition of claim 29, wherein the paint composition has a volatile organic compound content of less than about 50 g/L.

* * * * *